United States Patent
Zhang et al.

(10) Patent No.: US 9,998,934 B2
(45) Date of Patent: Jun. 12, 2018

(54) DEVICE AND METHOD FOR IDLE MODE POWER SAVING

(71) Applicant: APPLE INC., Cupertino, CA (US)

(72) Inventors: Wanping Zhang, San Jose, CA (US); Zhu Ji, San Jose, CA (US); Qiang Miao, Beijing (CN); Johnson O. Sebeni, Fremont, CA (US); Joshua Zhang, Beijing (CN)

(73) Assignee: APPLE INC., Cupertino, CA (US)

( * ) Notice: Subject to any disclaimer, the term of this patent is extended or adjusted under 35 U.S.C. 154(b) by 439 days.

(21) Appl. No.: 14/290,471

(22) Filed: May 29, 2014

(65) Prior Publication Data

US 2015/0350937 A1 Dec. 3, 2015

(51) Int. Cl.
H04W 24/08 (2009.01)
H04W 24/10 (2009.01)
H04W 24/02 (2009.01)
H04W 76/04 (2009.01)

(52) U.S. Cl.
CPC ........... *H04W 24/08* (2013.01); *H04W 24/02* (2013.01); *H04W 24/10* (2013.01); *H04W 76/048* (2013.01); *Y02B 60/50* (2013.01); *Y02D 70/00* (2018.01)

(58) Field of Classification Search
CPC ..... H04W 24/02; H04W 24/08; H04W 24/10; H04W 36/00; H04W 36/0005; H04W 36/0016; H04W 36/0055; H04W 36/0061; H04W 36/0066; H04W 36/165; H04W 36/24; H04W 36/30; H04W 36/36; H04W 52/40; H04W 76/048; Y02B 60/50; Y02D 70/00
See application file for complete search history.

(56) References Cited

U.S. PATENT DOCUMENTS

| 8,406,790 B2 | 3/2013 | Kazmi et al. | |
|---|---|---|---|
| 9,247,472 B2 | 1/2016 | Dalsgaard | |
| 2009/0135787 A1* | 5/2009 | Uemura | H04W 24/10 370/335 |
| 2011/0170420 A1* | 7/2011 | Xi | H04L 5/001 370/241 |
| 2012/0033595 A1* | 2/2012 | Aoyama | H04W 76/048 370/311 |
| 2013/0235738 A1 | 9/2013 | Siomina et al. | |
| 2013/0279353 A1 | 10/2013 | Ji et al. | |
| 2015/0271685 A9 | 9/2015 | Su et al. | |

FOREIGN PATENT DOCUMENTS

| CN | 102802192 | 11/2012 |
|---|---|---|
| CN | 103597877 | 2/2014 |
| CN | 103609161 | 2/2014 |

* cited by examiner

*Primary Examiner* — Khoa Huynh
(74) *Attorney, Agent, or Firm* — Fay Kaplun & Marcin, LLP

(57) ABSTRACT

A method to be performed by a wireless station having a wireless transceiver configured to establish a connection to a network, a processor and a non-transitory computer readable storage medium. The method includes receiving information during a first reception segment of a discontinuous reception cycle, wherein the discontinuous reception cycle includes the first reception segment and a first idle segment, performing a first measurement that begins during the first reception segment and performing a second measurement, wherein the second measurement begins prior to an end of the first measurement.

19 Claims, 5 Drawing Sheets

DEVICE AND METHOD FOR IDLE MODE POWER SAVING

BACKGROUND INFORMATION

A station may establish a connection to a wireless communications network. The wireless communications network may include cellular networks, WiFi networks, etc. A Long Term Evolution radio access network (LTE-RAN) is a particular type of cellular network. One features of stations that operate in accordance with the standards of the LTE-RAN is a power save mode known as Discontinuous Reception (DRX) in which the station or components thereof enter an idle mode when no data transmissions are scheduled. Specifically, when the station is inactive with respect to transmitting/receiving data to/from the LTE-RAN for a specific amount of time, the station may enter the DRX mode which includes active periods and idle periods for the as indicated in a DRX schedule. The station and the components wake to the active mode to receive control information from the LTE-RAN at known times according to the DRX schedule, for example, to determine if a data transmission has been scheduled. When no transmissions are scheduled, the station may then enter the idle mode until the next scheduled active mode.

The LTE-RAN and the various wireless communications networks may operate at respective frequencies and/or use respective Radio Access Technologies (RAT). As such, the station may further be configured to perform inter-RAT (iRAT) and/or inter-frequency measurements when more than one network is determined to be available at a given location in which the station is disposed. By performing the iRAT and/or the inter-frequency measurements, the station may determine whether a more optimal network is present for connection.

DETAILED DESCRIPTION

Figure 1:
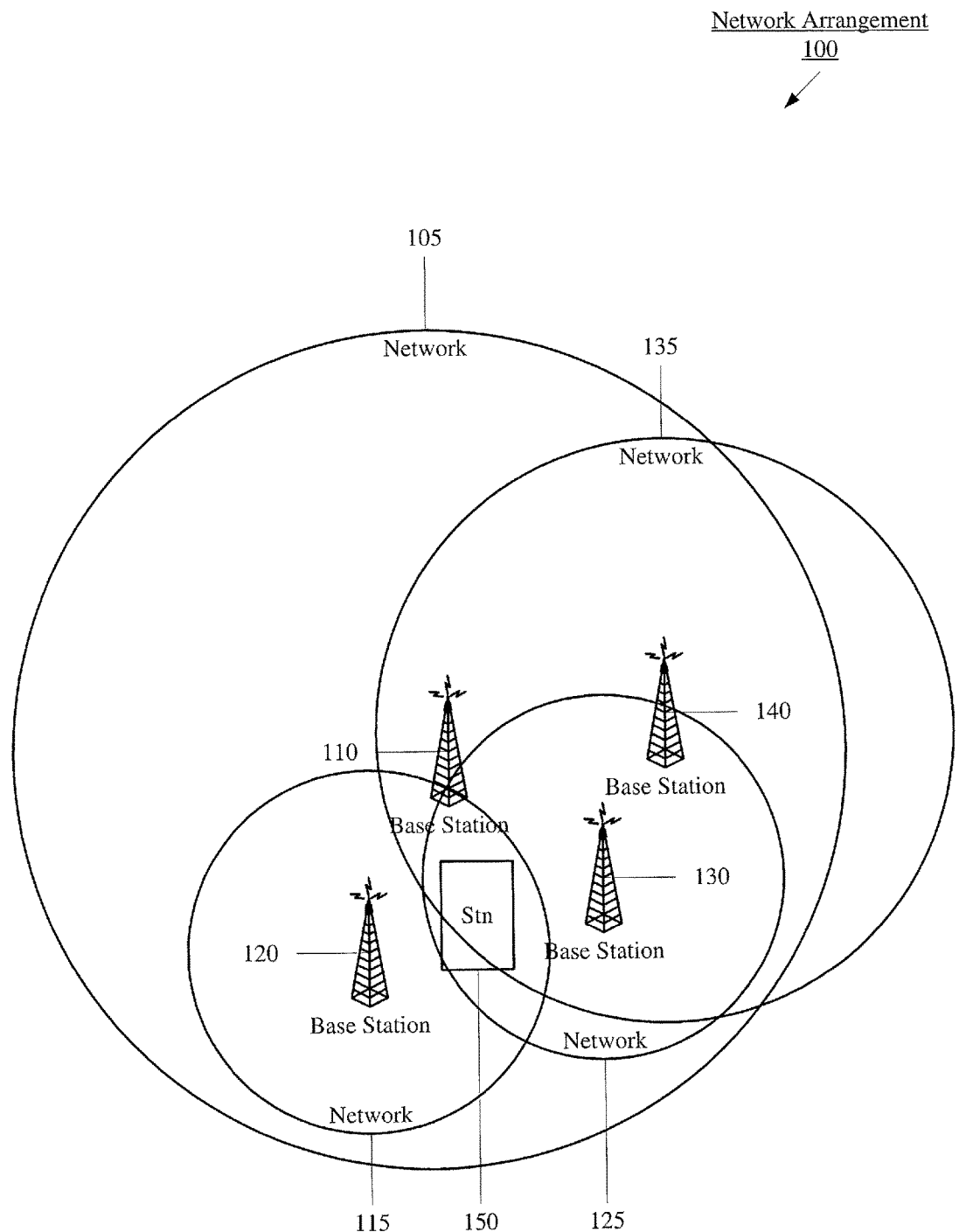
FIG. 1 shows an exemplary network arrangement in which a station performs network related measurements.

The exemplary embodiments describe a method to be performed by a wireless station. The method includes receiving information during a first reception segment of a discontinuous reception cycle, wherein the discontinuous reception cycle includes the first reception segment and a first idle segment, performing a first measurement that begins during the first reception segment and performing a second measurement, wherein the second measurement begins prior to an end of the first measurement.

The exemplary embodiments further describe a station having a wireless transceiver configured to establish a connection to a network and a processor. The processor and the wireless transceiver are configured to perform measurements by receiving information during a first reception segment of a discontinuous reception cycle, wherein the discontinuous reception cycle includes the first reception segment and a first idle segment, performing a first measurement that begins during the first reception segment, performing a second measurement, wherein the second measurement begins prior to an end of the first measurement and performing a third measurement, wherein the third measurement begins prior to an end of the second measurement.

The exemplary embodiments also describe a non-transitory computer readable storage medium having an executable program stored thereon. The executable program instructing a processor to perform operations including receiving information during a first reception segment of a discontinuous reception cycle, wherein the discontinuous reception cycle includes the first reception segment and a first idle segment, performing a first measurement that begins during the first reception segment, performing a second measurement, wherein the second measurement begins prior to an end of the first measurement and performing a third measurement, wherein the third measurement begins prior to an end of the second measurement.

The exemplary embodiments may be further understood with reference to the following description and the related appended drawings, wherein like elements are provided with the same reference numerals. The exemplary embodiments are related to a station and method for performing network related measurements such as iRAT or inter-frequency measurements during a discontinuous reception cycle. Specifically, the station may be connected to a Long Term Evolution radio access network (LTE-RAN) which utilizes Discontinuous Reception (DRX). The DRX may be performed according to a DRX schedule in which a cycle of the DRX schedule includes an active mode termed the OnDuration and an idle mode. The measurements may be performed in a parallel manner substantially coinciding with an onset of a first OnDuration, thereby limiting the duration of future OnDurations and allowing more time in the power saving idle mode.

A station connected to an LTE-RAN network may utilize a predetermined manner of receiving control channel information. Specifically, a DRX may be used that enables the station to save power when traffic activity is low, received in bursts, or received periodically. As described above, the DRX includes a DRX schedule that includes predetermined time periods for active mode and idle mode processing. The active mode of processing for the station may be triggered upon the beginning of an OnDuration while the idle mode may be used during all other times when no downlink data is being received (i.e., those times outside the OnDuration period). Thus, the station is not required to continuously monitor the downlink control channel information, thereby saving power.

The OnDuration of the DRX schedule is the predetermined time when control channel information is to be received by the station. Thus, the OnDuration may indicate a time in which the active mode is at least temporarily used. The OnDuration relates to a number of frames or subframes in a given cycle of the DRX schedule over which the station reads available downlink control channel information before entering the idle mode. Specifically, the OnDuration is a period of time based upon a number of subframes, which are constituent parts of a frame. The station receives the control channel information during these subframes.

If the decoded downlink control channel information indicates that there is downlink data transmission for the station, the station may remain awake using the active mode because the station will receive a downlink data transmission. When the decoded downlink control channel information indicates that no downlink data transmissions are scheduled for the station, the idle mode may be resumed. In this manner, each cycle of the DRX schedule may repeat until the downlink control channel information indicates a data transmission is scheduled for the station. Thus, each DRX cycle will include a portion of time where the station is in the active mode and a portion of time when the station is in the idle mode. Typically, the time in the idle mode will be substantially longer than the time in the active mode. The DRX cycle may have a predetermined duration N such as 40 ms, 20 ms, etc. For example, at a time 0, there may be an OnDuration for the control channel information to be received; subsequently, upon the OnDuration lapsing, the idle mode is used; then at a time N, there may be another OnDuration; subsequently, the idle mode is again used until a time 2N; etc. Exemplary DRX cycles will be illustrated and described in more detail below.

As discussed above, the DRX cycle includes the OnDuration in which the active mode is utilized for decoding any downlink control channel information. The station may be configured to perform other processes to coincide with the OnDuration such that a single active mode duration may be utilized for multiple purposes. In turn, the idle mode duration may be maximized. One such process may relate to when the station is at a location where a plurality of Radio Access Technologies (RAT) or network frequencies are available. Specifically, the process may include performing inter-RAT (iRAT) and/or inter-frequency measurements.

The iRAT and inter-frequency measurements are generally performed to support a handover of the station that may be performed for any number of reasons. In a first example, a base station of a network may experience high capacity because a large number of stations have connected to the base station. As a result, there may be a need to offload some of the stations to a different network such that remaining stations are not too adversely affected. In a second example, there may be a particular frequency may be experiencing interferences from other signals and thus, there may be a need to offload the stations to a different frequency to avoid the interference issues. In a third example, the station may be moving out of range of a currently connected network or cell. There may be a need to determine other available networks and/or cells.

To provide a specific example of a station that is currently connected to a base station of an LTE-RAN (e.g., an enhanced Node B (eNB)), there may be several handover or reselection scenarios for which the inter-frequency or iRAT measurements may be performed. A first example handover/reselection scenario is an Intra-LTE handover where the station may be handed over to a different frequency on the same eNB. A second example handover/reselection scenario is an Intra-LTE handover where the station may be handed over to a different eNB of the LTE-RAN. A third example handover/reselection scenario is an Inter-LTE handover where the station is handed over to a different type of RAT such as a legacy RAN, e.g., Global System for Mobile Communications (GSM), a Universal Mobile Telecommunications System (UMTS) network, a Time Division Synchronous (TD-S) Code Division Multiple Access (CDMA) (TD-SCDMA, Wideband CDMA (W-CDMA), etc.

The iRAT measurements that are performed by the station may include, for example, a measurement of parameters of a reference signal received from the currently connected base station. These parameters may include the received signal strength indication (RSSI), received signal code power (RSCP), Energy per chip/Noise spectral density (Ec/Io), etc. It should be understood that the above measurements are only exemplary and other types of measurements may be performed by the station to support iRAT.

In view of the various reasons described above, the network may determine that the iRAT and/or inter-frequency measurements are to be performed. However, it should be noted that the network making this determination is only exemplary and the station itself may determine that the iRAT and/or inter-frequency measurements are to be performed. When the network determines that the station is to perform the iRAT and/or inter-frequency measurements, the network may transmit a corresponding request to the station. The iRAT and/or inter-frequency measurements may be performed to prepare for a handover/reselection procedure to subsequently be performed such that continuous service may be provided to the station.

FIG. 1 shows an exemplary network arrangement 100 in which a station 150 performs inter-frequency and/or iRAT measurements. The network arrangement 100 may relate to a given area in which various wireless networks are available for connection by the station 150. Specifically, the network arrangement 100 may include a first network 105 having a base station 110, a second network 115 having a base station 120, a third network 125 having a base station 130, and a fourth network 135 having a base station 140. The first network 105, the second network 115, the third network 125, and the fourth network 135 may be configured for communication between each other or with other networks such as the Internet.

The first network 105, the second network 115, the third network 125, and the fourth network 135 may be any type of network. For example, the networks 105, 115, 125, 135 may be cellular networks, WiFi networks, a combination of different types of networks, etc. Therefore, the networks 105, 115, 125, 135 may each utilize a different RAT. As such, the network arrangement 100 may be a multi-RAT wireless network. The station 150 may be within the network arrangement 100, specifically within a coverage area of each of the networks 105, 115, 125, 135. As shown, the network 105 may have a relatively large coverage area in which the coverage areas of the networks 115, 125 are wholly included and the coverage area of the network 135 is partially included. The coverage areas of the networks 105, 115, 125, 135 may also overlap such that an area within the network arrangement 100 may include all four networks 105, 115, 125, 135. The station 150 may be located in this overlapping area in which all four networks 105, 115, 125, 135 are available. It may also be assumed that the station 140 is configured with the RATs that are utilized by the networks 105, 115, 125, 135.

It should be noted that the use of three networks is only exemplary. Those skilled in the art will understand that any number of networks may be present in the network arrangement 100 and in any configuration in which more than one network using different RATs is available. For example, the manner in which the networks 105, 115, 125, 135 overlap as illustrated in the network arrangement 100 is only exemplary. In another example, the networks 115, 125 being wholly included within the coverage area of the network 105 is only exemplary. The networks 115, 125 may only be partially included in a similar manner as the network 135. It should further be noted that the sizes of the networks 105, 115, 125, 135 are only exemplary and that the sizes of each of the coverage areas of the networks 105, 115, 125, 135 may be different.

It should be noted that the iRAT measurements and inter-frequency measurements may be performed in substantially similar manners. For illustrative purposes only, the description below relates to the iRAT measurements. However, those skilled in the art will understand that the inter-frequency measurements may be performed and used in a substantially similar manner.

As discussed above, the station 150 may be configured to perform the iRAT measurements. For example, the station 150 may be connected to network 135 via the base station 140. However, the station 150 may be moving and detected by the network 135 to be moving out of its coverage area. Accordingly, the network 135 may request that the iRAT measurements be performed by the station 150. As shown in the network arrangement 100 and the location of the station 150, the iRAT measurements may be for the networks 105, 115, 125 whose identities may be determined by the station 150 or may also be included in the request transmitted from the network 135.

Figure 2:
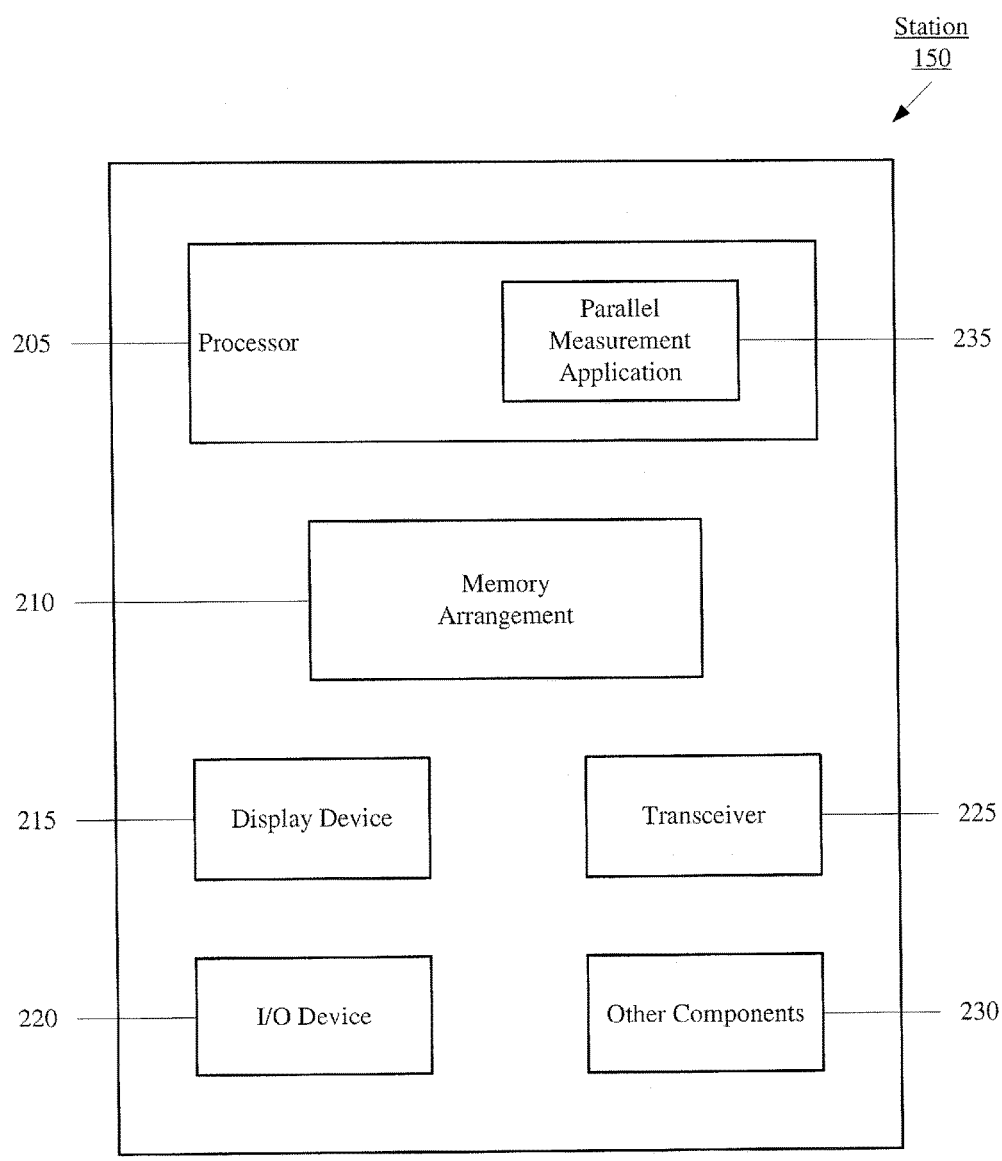
FIG. 2 shows components of an exemplary station configured to perform network related measurements.

FIG. 2 shows components of the station 150 configured to perform the iRAT measurements. Specifically, the station 150 may determine or receive a number N of iRAT measurements to be performed and further schedule these measurements to be performed in a parallel manner within the context of a DRX schedule. The station 150 may represent any electronic device configured to connect to the networks 105, 115, 125, 135 and perform the parallel measurement. For example, the station 150 may be a portable device such as a cellular phone, a smartphone, a tablet, a phablet, a laptop, etc. The station 150 may include a processor 205, a memory arrangement 210, a display device 215, an input/output (I/O) device 220, a transceiver 225, and other components 230 such as a portable power supply, an audio I/O device, etc.

The processor 205 may be a baseband processor that includes firmware that is configured to be executed to perform applications. In another example, the processor may be an applications processor. In one example, the applications may include a parallel measurement application 235. As will be described in further detail below, the parallel measurement application 235 may determine a schedule and perform the measurements in a parallel manner.

It should be noted that the above noted applications each being an application (e.g., a program) executed by the processor 205 is only exemplary. The applications may also be represented as a separate incorporated component of the station 150 or may be a modular component coupled to the station 150, e.g., an integrated circuit with or without firmware.

The memory arrangement 210 may be a hardware component configured to store data related to operations performed by the station 150. For example, the memory arrangement 210 may store association information such as credentials used to join the various networks. The memory arrangement 210 may also store the measurements that are performed. The display device 215 may be a hardware component configured to show data to a user while I/O device 220 may be a hardware component configured to receive inputs from the user and output corresponding data such as a hostname request. The transceiver 225 may enable the station 150 to communicate with the networks 105, 115, 125, 135. As such, the transceiver 225 may include any number of antennas (e.g., main antenna, diversity antenna, etc.) in any number of orientations for data transmissions to be made using the various frequencies and/or RATS. The other components 230 may include a portable power supply (e.g., battery), a data acquisition device, ports to electrically connect the remote station 140 to other electronic devices, etc.

According to the exemplary embodiments, the parallel measurement application 235 may determine a manner in which to schedule the iRAT measurements in a parallel manner. Specifically, in one DRX wakeup period, a plurality of iRAT measurements are started such that during one or more subsequent DRX wakeup periods, additional iRAT measurements do not need to be performed. Accordingly, the measurement results may be available at a relatively similar time in case a reselection decision is required to be determined.

It should be noted that there is no inherent relationship between the DRX cycle and the iRAT measurements. That is, the functionality of DRX cycle does not depend on the iRAT measurements and vice versa. The reason that these two concepts are being described together is that, as described above, the DRX cycle includes the processor 205 having an active mode and an idle mode. When the processor 205 is in the active mode, in addition the processing required for the OnDuration of the DRX cycle, the processor 205 may also perform other processing tasks such as the iRAT measurements, rather than wakeup the processor 205 when it is in the idle mode to perform the iRAT measurements. The exemplary embodiments efficiently schedule and perform the iRAT measurements in conjunction with the DRX cycle, specifically the OnDuration of the DRX cycle.

Figure 3A:
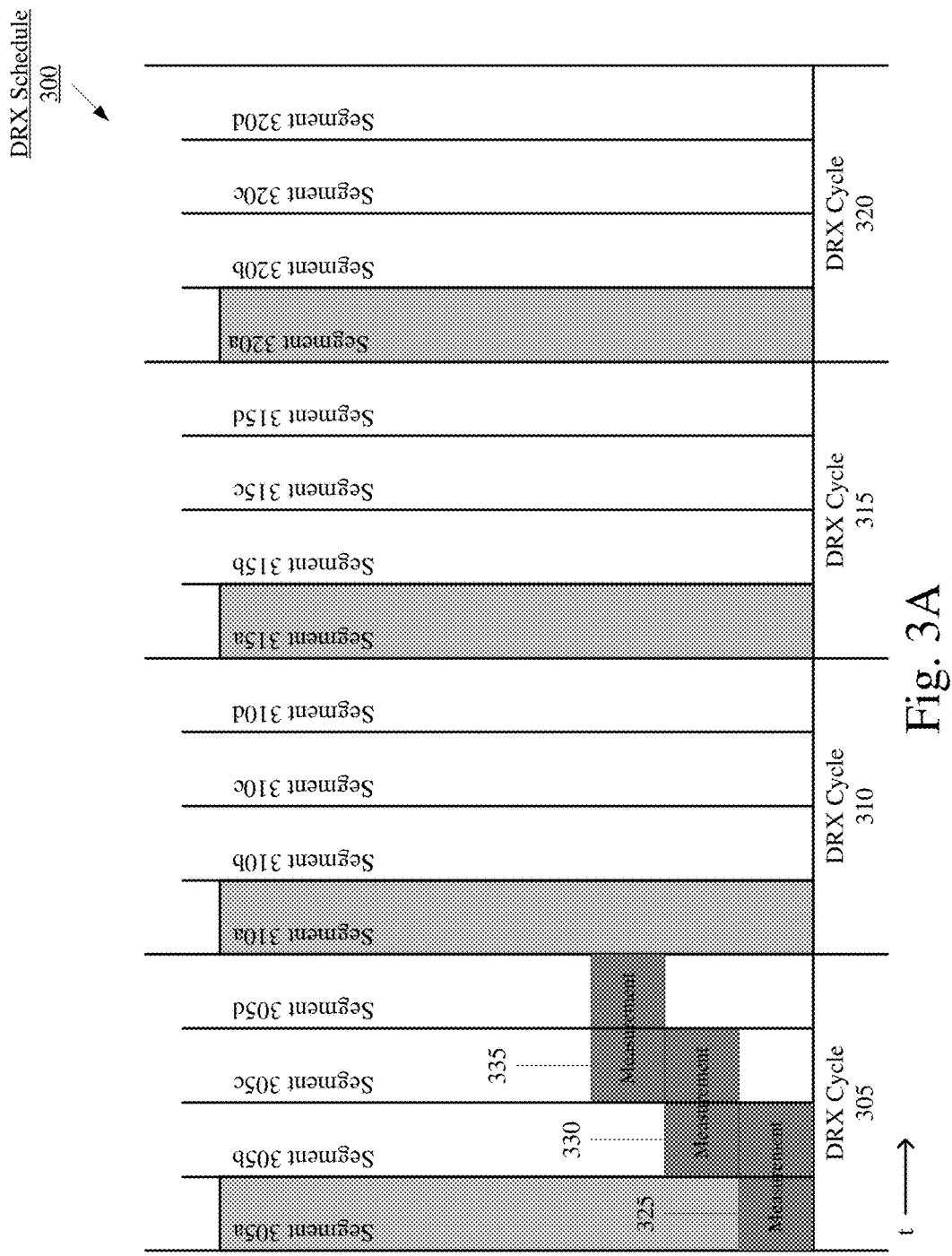
FIG. 3A shows an exemplary DRX schedule in which network related measurements are performed in parallel.

FIG. 3A shows a DRX schedule 300 in which network related measurements are performed. The DRX schedule 300 may include a plurality of DRX cycles 305-320 in which each DRX cycle includes a plurality of segments. Each segment may include one or more frames and/or subframes as was described above. As shown, the DRX cycle 305 may include segments 305*a-d*; the DRX cycle 310 may include segments 310*a-d*; the DRX cycle 315 may include segments 315*a-d*; and the DRX cycle 320 may include segments 320*a-d*.

The DRX cycles 305-320 may have a predetermined length. For example, each of the DRX cycles 305-320 may be 40 ms in duration. With each cycle including four segments and with equivalent segments, each segment may also have a predetermined length. For example, with each cycle being 40 ms, each segment may be 10 ms. Considering the DRX cycle 305 in more detail, in one example, it may be considered that each segment 305*a-d* is equivalent to the length of one frame (e.g., each frame is 10 ms). It may further be considered that each frame includes ten equivalent sub-frames that are each 1 ms. Thus, in DRX cycle 305, there would be 4 frames, each having 10 subframes for a total of 40 subframes. The DRX schedule 300 may indicate that the station 150 should be in the active mode for one of these subframes to receive the downlink control channel information. Thus, in this example, the station 150 would be in the active mode for one subframe (e.g., 1 ms) and in the idle mode for thirty-nine subframes (e.g., 39 ms) during each DRX cycle. However, it should be noted that the above example of a 40 ms duration for the DRX cycles and the number of frames and subframes in a segment is only exemplary. There may be any number of segments, frames and subframes in a DRX cycle and the exemplary embodiments may be applied to any number or duration of segments, frames or subframes in accordance with the principles described herein. Throughout the remainder of this description, the DRX cycles will be described with reference to segments (e.g., segments 305*a-d*). However, from the above example, it should be clear that the segments may relate to frames/subframes.

For the purposes of illustration, in the example of FIG. 3A, it will be considered that each DRX cycle 305-320 includes an OnDuration (e.g., station 150 in active mode) of one segment and an idle mode of three segments. Thus, in FIG. 3A, segments 305a, 310a, 315a, 320a are shown with a light gray shading may be considered the segments of the corresponding DRX cycle 305-320 where the station is in the active mode receiving downlink control channel information. While the remaining segments, 305b-d, 310b-d, 315b-d and 320b-d, are not shaded indicating that the station 150 is in the idle mode during these segments. Again, it should be clear that DRX cycles 305-320 of FIG. 3 are only for illustrative purposes and it is unlikely that the active mode takes up 25% of a DRX cycle (e.g., 1 of 4 total segments in a DRX cycle). Thus, in the example of FIG. 3A, without considering the measurements 325-335 that will be discussed in greater detail below, each DRX cycle (e.g., DRX cycles 305-320) include an OnDuration of one segment (e.g., segments 305a, 310a, 315a, 320a) and the station 150 in idle mode for three segments (e.g., segments 305b-d, 310b-d, 315b-d and 320b-d).

When the network 135 transmits a request for the iRAT measurements to be performed, the station 150 may be configured to perform the measurements. Specifically, the DRX schedule 200 may include N measurements corresponding to the networks in which the iRAT measurements are to be performed. As discussed above, the N measurements may be three for the networks 105, 115, 125. As described above, while the exemplary embodiments are being described as applying to inter-RAT measurements, the same type of measurements may be made in the intra-RAT scenarios (e.g., intra-LTE handover to a different frequency on the same eNB, intra-LTE handover to a different eNB, etc.) and the exemplary embodiments may also be applied to these scenarios. These measurements are shown in the DRX schedule 300 as measurements 325, 330, 335. For illustrative purposes, the measurement 325 may correspond to the network 105; the measurement 330 may correspond to the network 115; and the measurement 335 may correspond to the network 125. The measurements 325, 330, 335 may be performed in parallel as scheduled by the parallel measurement application 235.

When the parallel measurement application 235 determines that the measurements 325-335 are to be performed, the parallel measurement application 235 may determine when a next available OnDuration is scheduled based upon the DRX schedule 300. It may be considered in this example that it was determined that the measurements 325-335 are to be performed prior to the DRX cycle 305 commencing. As shown, the measurement 325 may be performed coinciding with the onset of segment 305a in which the OnDuration is triggered and an active mode is used to decode downlink control channel information. Again, the station 150 and the components thereof are awake for the OnDuration and continue to be awake during the time for performing the iRAT measurements 325-335. To provide a specific example referring to the components of FIG. 2, when the station is in idle mode with respect to wireless communications, the processor 205 (e.g., a baseband processor) may be in a low power state and the transceiver 225 may be in a low power state. When the OnDuration begins, these components may transition to the full power awake state to perform the functions associated with the OnDuration and the measurements, if required.

Referring back to FIG. 3A, the measurement 325 is illustrated as lasting from the start of segment 305a until the end of segment 305b. The measurement 330 may be performed from the start of segment 305b and lasting until the end of segment 305c. Since there is yet another measurement, the measurement 335 may be performed from the start of segment 305c and lasting until the end of segment 305d. It should be noted that the matching of the starting and finishing of the measurements 325-335 with the starting and finishing of the segments 305a-d is only exemplary. While the measurement 325 may be scheduled to commence at the commencement of the segment 305a that is the OnDuration, the amount of time that it takes to complete measurement 325 may be any amount of time that does not coincide with the segments 305a or 305b. Furthermore, the commencement of measurements 330 and 335 may depend on the progress of the previously performed measurement (e.g., measurement 325 in the case of measurement 330 and measurement 330 in the case of measurement 335). It should also be noted that each of the measurements 325-335 having the same duration is also only exemplary. Each measurement 325-330 may take a different amount of time to complete.

Therefore, the measurements 325-335 corresponding to the networks 105, 125, 135 may be performed in a relatively synchronous manner (e.g., within the duration of the DRX cycle 305 only). With no measurements being performed during the DRX cycle 310 and the DRX cycle 315, power may further be conserved since only the decoding of the downlink control channel information is performed. Specifically, in DRX cycle 310, the segment 310a is the only time during which the active mode is used (assuming that no downlink data communications are scheduled for the station 150). A likewise situation occurs in the DRX cycle 315 and DRX cycle 420. As will be described in greater detail below, the parallel manner of performing the measurements reduces the amount of time required to perform the measurements, reduces the amount of power that is consumed during the DRX cycles and makes the measurements available to the station 150 at an earlier time.

Figure 3B:
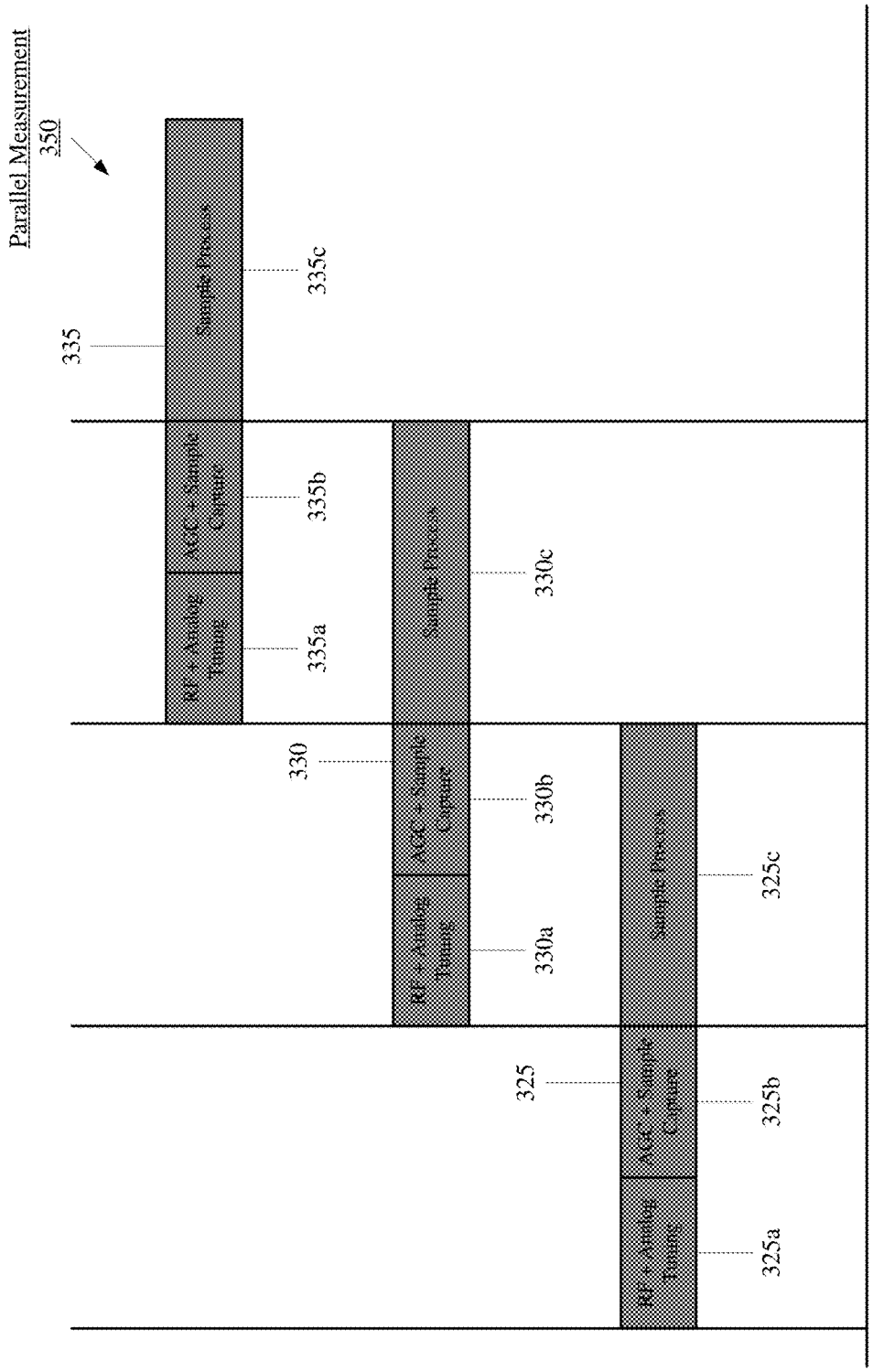
FIG. 3B shows exemplary processes included in the parallel measurements of FIG. 4A.

FIG. 3B shows exemplary processes for a parallel measurement 350 for the measurements 325-335 illustrated in FIG. 3A. That is, FIG. 3B more specifically shows the manner in which the parallel measurements 325-335 are performed. The measurement 325 may include a radio frequency (RF) and analog tuning process 325a; an automatic gain control (AGC) and sample capture process 325b; and a sample processing process 325c. Each of the other measurements 330, 335 may also include substantially similar processes. To further illustrate, the process 325a is first performed followed by the process 325b. The process 325c may include a measurement processing of the sample and ultimately tuning back. After the processes 325a, b of measurement 425 are completed, an RF front-end of a baseband processor (e.g., processor 205) is available for use for other measurements. Thus, the parallel measurement application 235 may schedule a subsequent measurement, namely measurement 330. Thus, the process 330a of measurement 330 may begin upon the conclusion of the process 325b. A substantially similar parallel mechanism may be used with the measurement 335 which may initiate with process 335a upon the conclusion of process 330b. It should be noted that in the example of FIG. 3B, it is illustrated that the processes 325a and 325b are equal in length and that the process 325c is equal to the combination of 325a and 325b (i.e., 325a+325b=325c). Again, this is only exemplary, the amount of time that it takes to complete the processes 325a and 325b may be different and the amount of time it takes to complete process 325c may not equal the amount of time of the combined processes 325a and 325b. Typically, the amount of time it takes to complete the sample processing 325c will be longer than the combination of the RF and Analog tuning 325a and the ASGC and sample capture 325b.

It should be noted that the number of measurements that may be scheduled during a single DRX wakeup period may be predetermined. For example, the parallel measurement application 235 may schedule the plurality of iRAT measurements based upon a total number allowed. The total number allowed may be set or determined based upon a variety of factors such as a known total time for a measurement to be performed relative to a known total duration of the cycle. In another example, the parallel measurement application 235 may dynamically cap the number of iRAT measurements to be performed based upon a varying time for each measurement compared to a known total duration of the cycle without exceeding the cycle duration. In yet another example, the parallel measurement application 235 may not limit the number of iRAT measurements that are allowed to be performed from an onset of an OnDuration.

It should also be noted that the parallel manner of performing the measurements 325-335 as shown in FIG. 3A is only exemplary. Depending on the times for each process of the measurement, the total time required for all the measurements 325-335 to be performed may be greater than or less than a duration of the DRX cycle 305. For example, when the processes 325a, 325b, 330a, 330b, 335a, 335b each require less than 5 ms and the processes 325c, 330c, 335c each require less than 10 ms, the measurements 325-335 may all be performed within the duration of the exemplary DRX cycle 305 which is 40 ms. In such a scenario, the idle mode duration with regards to performing measurements is even further optimized. In another example, when the processes 325a, 325b, 330a, 330b, 335a, 335b each require more than 5 ms and the processes 325c, 330c, 335c each require more than 10 ms, the measurements 325-335 may require more time than is available in the duration of the exemplary DRX cycle 305 which is 40 ms. Accordingly, the measurements 325-335 may bleed into the subsequent cycle 310. Nevertheless, in such a scenario, the idle mode duration with regards to performing measurements may still be more optimal than an idle mode duration provided by a sequential performance of measurements.

The parallel measurement application 235 may further consider additional aspects for scheduling the measurements 325-335. For example, an adaptive grouping feature may be used. The parallel measurement application 235 may attempt to group a maximum number of measurements to be performed for a single wakeup period of a DRX cycle to optimize power saving. To further optimize the scheduling of the measurements, the parallel measurement application 235 may base the order of the measurements on network parameters including serving cell air-link conditions (e.g., RSSI, signal to noise ratio (SNR), interference measurements, etc.). Thus, one measurement may be prioritized over another measurement. Using the above example, the measurement 225 may have been prioritized first due to its RSSI value being greatest while the measurement 335 may have been prioritized last due to its RSSI value being lowest.

Figure 4:
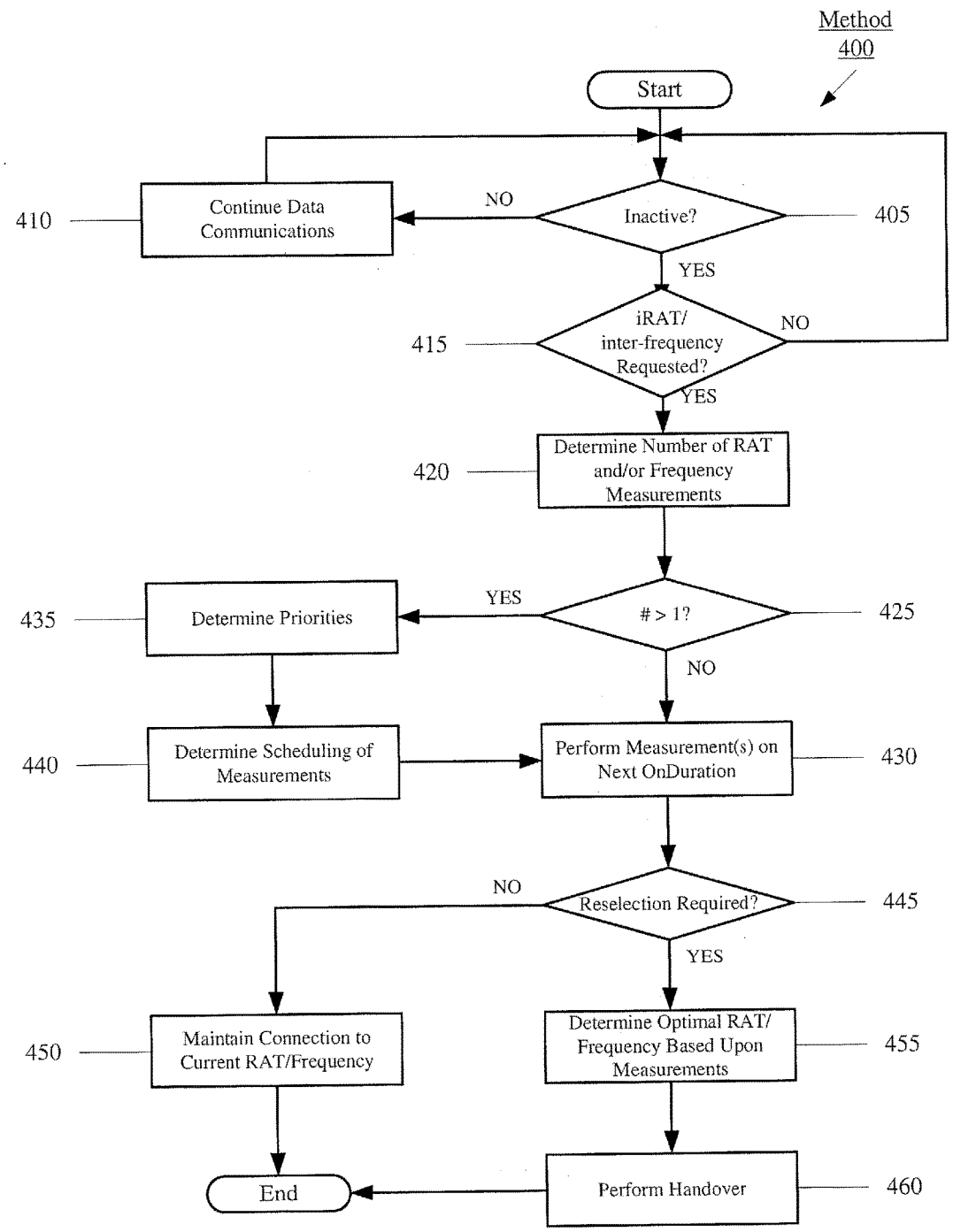
FIG. 4 shows an exemplary method for performing network related measurements.

FIG. 4 shows an exemplary method 400 for performing iRAT and/or inter-frequency measurements. The method 400 relates to an overall procedure of scheduling the measurements to be performed as well as performing a handover/reselection when required. The method 400 will be described with regard to the network arrangement 100 of FIG. 1, the station 150 of FIG. 2, and the DRX schedule 300 of FIG. 3A.

It should be noted that it may be assumed that the station 150 is currently connected to a network such as network 135 and that the station 150 has received or determined that iRAT measurements are to be performed. It may also be assumed that the network 135 is an LTE-RAN that utilizes DRX. Thus, in step 505, the parallel measurement application 235 initially determines a data transmission state of the station 150. The data transmission state may relate to whether the station 150 is in an active state in which data is being transmitted and/or received in the uplink and/or downlink or in a state that includes an idle mode such as DRX. It should be understood that if the station is in a fully active mode, the measurements may be made at any time during this fully active mode because there is no power saving advantage to be gained when the components are in the active state already. If the station 150 is in an active state the data communications are continued in step 410 and the parallel measurement application 235 continues the method 400 back to step 405 to determine whether the station 150 is inactive regarding data transmissions.

However, if the parallel measurement application 235 determines that the station is inactive, the parallel measurement application 235 continues the method 400 to step 415 where it is determined if the station 150 should perform iRAT and/or inter-frequency measurements. As described above, the network to which the station 150 is currently connected (e.g., network 135) may request the station 150 to perform measurements associated with an iRAT procedure for any number of reasons, examples of which were described above. If there is no current request for the iRAT or inter-frequency measurements, the parallel measurement application 235 continues the method 400 back to step 405 to determine whether the station 150 is inactive regarding data transmissions.

However, if the station 150 is requested to perform the iRAT or inter-frequency measurements, in step 420, the parallel measurement application 235 determines a number of iRATs and/or inter-frequency measurements to be performed. As discussed above, this number and identities may be determined by the station 150 or may be provided to the station, such as in the request from the network 135. In step 425, the parallel measurement application 235 determines whether the number of measurements is greater than one.

If the parallel measurement application 235 determines that the number of measurements is not greater than one (i.e., there is only one measurement or none), the parallel measurement application 235 continues the method 400 to step 430. In step 430, the parallel measurement application 235 performs the single measurement on a next available OnDuration of the DRX schedule. In this scenario, the performance of the measurement may be substantially similar to that described in the DRX schedule 300 in which only a single measurement is done within a given DRX cycle, e.g., measurement 325 is performed and the measurements 330 and 335 do not exist.

If the parallel measurement application 235 determines that the number of measurements is greater than one (e.g., measurements 325-335), the parallel measurement application 235 continues the method 400 to step 435 where the parallel measurement application 235 determines the priorities of the measurements to be performed. For example, the measurement 325 may take precedence over measurements 330, 335 while measurement 330 takes precedence over measurement 335. For example, the priorities may be based upon network metrics such as received signal strength indication (RSSI) values, signal to noise ratio (SNR), interference measurements, etc. In another example, the network may provide the station with a set order of priorities.

In step 440, the parallel measurement application 235 schedules the measurements 325-335 in a parallel manner. As described above in the DRX schedule 300 of FIG. 3A and the parallel measurement 350 of FIG. 3B, the measurement 325 may be started and processes 325 a and b may be performed. Upon completion of process 325b, the measurement 330 may be started while the process 325c is continued. This may continue until all measurements are scheduled. The parallel measurement application 235 continues the method 400 to step 430. In contrast to when only one measurement is performed, this time, the measurements 325-335 are performed according to the schedule as shown in FIG. 3A. Upon completing the measurements, the station 150 may store the results in the memory arrangement 210.

In step 445, the station 150 may or may not receive a request to perform a reselection or determine that a reselection is required. If a reselection is not required, the station 150 continues the method 400 to step 450 in which the connection to the current RAT and/or frequency is maintained. However, if a reselection is required, the station 150 continues the method 400 to step 455. In step 455, the station 150 accesses the stored results of the measurements 325-335 (or sends the results to the base station) to determine an optimal RAT or frequency to roam. Thus, in step 460, the handover procedure is performed.

It should again be noted that when the reselection is required, the station 150 may be privy to more results of measurements performed using the parallel manner according to the exemplary embodiments in comparison to the sequential manner according to conventional standards. When using the parallel manner of performing the measurements within the context of the DRX schedule 300, the results of the measurements 325-335 may be known by the end of the DRX cycle 305. In contrast, if the measurements were performed in series, the results of the measurements would not be known until a time after the DRX cycle 305.

It should be noted that the DRX schedule described above may relate to a long DRX cycle in which a cycle is defined as one OnDuration and one idle mode duration. However, those skilled in the art will understand that LTE specifications also include a short DRX cycle which may be an intermediary DRX stage that is entered upon completing a data transmission or active mode duration. The short DRX cycle also includes one OnDuration and one idle mode duration in which the idle mode duration is shorter than that used in the long DRX cycle. Nevertheless, in view of the manner of the short DRX cycle operating in a substantially similar manner as the long DRX cycle, the exemplary embodiments may be utilized under either type of cycle duration or other types of cycle durations that may be used in the LTE specification.

It should also be noted that the use of the DRX schedule when connected to a LTE-RAN is only exemplary. The exemplary embodiments may also be used for any idle mode scheduling used by any network type. For example, a WiFi network may have a specification for power saving in which control information is transmitted to the station according to a schedule substantially similar to the DRX schedule. Those skilled in the art will understand that the exemplary embodiments may be adapted for these other idle mode specifications and network types.

The exemplary embodiments provide a station and method for utilizing a parallel measurement mechanism. The station may be connected to a network that requests that iRAT and/or inter-frequency measurements be performed due to a potential handover being required. The exemplary embodiments allow the station to determine a total number of measurements to be performed and schedule the measurements to be performed in a parallel manner in which a measurement overlaps with a prior measurement, a subsequent measurement, or both. Since the measurements include a first half that utilizes the RF and a second half that does not, a subsequent measurement may be initiated upon the RF becoming available. In this manner, all the measurements may be performed in a substantially synchronous manner (e.g., all within a single DRX cycle) compared to a conventional sequential manner in which only one measurement may be performed for a given DRX cycle (i.e., requiring N DRX cycles based upon N measurements that need to be performed).

Those skilled in the art will appreciate that the exemplary embodiments apply to all cellular technologies during their idle measurements. In the specific example of TDS-CDMA networks, due to the multiple-frequency planning, it is a very common field scenario that a station needs to perform more than one inter-frequency measurement in the idle mode. Other IRAT measurements such as T2G (i.e., TDS to GSM) and T2L (i.e., TDS to Tapped Delay Line (TDL)) are also common scenarios considering better coverage of GSM and high RAT priority of TDL, respectively.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform and MAC OS, a mobile hardware device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method, comprising:
   at a wireless station:
      receiving information during a first reception segment of a discontinuous reception cycle, wherein the discontinuous reception cycle includes the first reception segment and a first idle segment;
      performing a first measurement that begins during the first reception segment; and
      performing a second measurement, wherein the second measurement begins after the first measurement begins and prior to an end of the first measurement;
         wherein the first and second measurements extend beyond the first reception segment of the discontinuous reception cycle into the first idle segment and are completed prior to a start of a second reception segment of a second discontinuous reception cycle.

2. The method of claim 1, further comprising:
   performing a third measurement, wherein the third measurement begins prior to an end of the second measurement.

3. The method of claim 1, wherein the first measurement begins at the start of the first reception segment.

4. The method of claim 1, wherein the second measurement begins when a radio resource of the wireless station is released from performing a portion of the first measurement.

5. The method of claim 1, further comprising:
determining a priority of the first and second measurements, wherein the first measurement is started prior to the second measurement based on the determined priority.

6. The method of claim 5, wherein the priority is based upon network metrics including at least one of received signal strength indication (RSSI) values, a signal to noise ratio (SNR), and interference measurements.

7. The method of claim 1, further comprising:
determining additional measurements that are to be performed by the wireless station.

8. The method of claim 7, further comprising:
performing the additional measurements, wherein a first of the additional measurements begins prior to an end of the second measurement and each subsequent additional measurement begins prior to an end of an immediately preceding additional measurement, wherein the additional measurements are completed prior to a start of a second reception segment of a second discontinuous reception cycle.

9. The method of claim 7, further comprising:
performing the additional measurements, wherein a first portion of the additional measurements are completed prior to a start of a second reception segment of a second discontinuous reception cycle and a second portion of the additional measurements are started during the second reception segment and completed prior to a start of a third reception segment of a third discontinuous reception cycle.

10. The method of claim 1, further comprising:
receiving an instruction from a currently connected network to perform the first and second measurements.

11. The method of claim 1, wherein the first and second measurements are one of Inter-Radio Access Technology (RAT) measurements, Intra-RAT measurements and inter-frequency measurements.

12. The method of claim 1, further comprising:
sending the results of the first and second measurements to a currently connected network; and
receiving a further request to perform a reselection process, the reselection process being performed based upon results of the first and second measurements, wherein the reselection process includes one of the wireless station switching from a current network to a new network, switching from a current base station of a current network to a new base station of the current network or switching from a current frequency of a current base station to a new frequency of a current base station.

13. A station, comprising:
a wireless transceiver configured to establish a connection to a network; and
a processor,
wherein the processor and the wireless transceiver are configured to perform measurements by:
receiving information during a first reception segment of a discontinuous reception cycle, wherein the discontinuous reception cycle includes the first reception segment and a first idle segment;
performing a first measurement that begins during the first reception segment;
performing a second measurement, wherein the second measurement begins after the first measurement begins and prior to an end of the first measurement; and
performing a third measurement, wherein the third measurement begins prior to an end of the second measurement
wherein the first, second and third measurements extend beyond the first reception segment of the discontinuous reception cycle into the first idle segment and are completed prior to a start of a second reception segment of a second discontinuous reception cycle.

14. The station of claim 13, wherein the first measurement begins at the start of the first reception segment.

15. The station of claim 13, wherein the processor is a baseband processor that includes a radio resource and the second measurement begins when the radio resource of the baseband processor is finished performing a portion of the first measurement.

16. The station of claim 13, wherein the processor is further configured to determine a priority of the first, second and third measurements, wherein an order of performing the first, second and third measurements is determined based on the priority.

17. The station of claim 13, wherein the station has a current connection to an LTE Radio Access Network (LTE-RAN) and receives an instruction from the LTE-RAN to perform the first, second and third measurements.

18. The station of claim 17, wherein the first, second and third measurements are one of Inter-Radio Access Technology (RAT) measurements that are performed when the station is to perform a handover operation to a different network that is not an LTE-RAN, Intra-RAT measurements that are performed when the station is to perform a handover operation to a different base station of the LTE-RAN and inter-frequency measurements that are performed when the station is to perform a reselection operation to a different frequency of a current base station of the LTE-RAN.

19. A non-transitory computer readable storage medium having an executable program stored thereon, the executable program instructing a processor to perform operations, comprising:
receiving information during a first reception segment of a discontinuous reception cycle, wherein the discontinuous reception cycle includes the first reception segment and a first idle segment;
performing a first measurement that begins during the first reception segment;
performing a second measurement, wherein the second measurement begins after the first measurement begins and prior to an end of the first measurement; and
performing a third measurement, wherein the third measurement begins prior to an end of the second measurement
wherein the first, second and third measurements extend beyond the first reception segment of the discontinuous reception cycle into the first idle segment and are completed prior to a start of a second reception segment of a second discontinuous reception cycle.

* * * * *